United States Patent
Ash et al.

(10) Patent No.: US 7,975,169 B2
(45) Date of Patent: Jul. 5, 2011

(54) MEMORY PRESERVED CACHE TO PREVENT DATA LOSS

(75) Inventors: Kevin John Ash, Tucson, AZ (US); Michael Thomas Benhase, Tucson, AZ (US); Lokesh Mohan Gupta, Tucson, AZ (US); Alfred Emilio Sanchez, Tucson, AZ (US); Kenneth Wayne Todd, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 446 days.

(21) Appl. No.: 12/132,087

(22) Filed: Jun. 3, 2008

(65) Prior Publication Data

US 2009/0300298 A1 Dec. 3, 2009

(51) Int. Cl.
*G06F 11/00* (2006.01)
(52) U.S. Cl. .............................. 714/6; 714/5
(58) Field of Classification Search .......... 714/4, 5, 714/6
See application file for complete search history.

(56) References Cited

U.S. PATENT DOCUMENTS

| | | | | |
|---|---|---|---|---|
| 5,375,227 | A * | 12/1994 | Akatsu et al. | 714/5 |
| 5,448,719 | A * | 9/1995 | Schultz et al. | 714/5 |
| 5,771,367 | A * | 6/1998 | Beardsley et al. | 711/162 |
| 6,006,342 | A * | 12/1999 | Beardsley et al. | 714/5 |
| 6,438,661 | B1 * | 8/2002 | Beardsley et al. | 711/144 |
| 6,502,174 | B1 * | 12/2002 | Beardsley et al. | 711/170 |
| 6,513,097 | B1 * | 1/2003 | Beardsley et al. | 711/113 |
| 6,658,542 | B2 * | 12/2003 | Beardsley et al. | 711/162 |
| 6,792,511 | B2 * | 9/2004 | Hameed | 711/135 |
| 6,988,171 | B2 * | 1/2006 | Beardsley et al. | 711/144 |
| 7,051,174 | B2 * | 5/2006 | Ash et al. | 711/162 |
| 7,100,074 | B2 * | 8/2006 | Watanabe et al. | 714/9 |
| 7,139,933 | B2 * | 11/2006 | Hsu et al. | 714/6 |
| 7,529,776 | B2 * | 5/2009 | Li et al. | 1/1 |
| 2002/0138695 | A1 * | 9/2002 | Beardsley et al. | 711/113 |
| 2003/0070041 | A1 * | 4/2003 | Beardsley et al. | 711/113 |
| 2004/0181639 | A1 * | 9/2004 | Jarvis et al. | 711/161 |
| 2004/0255181 | A1 * | 12/2004 | Hsu et al. | 714/2 |
| 2005/0005188 | A1 * | 1/2005 | Hsu et al. | 714/2 |
| 2005/0138318 | A1 * | 6/2005 | Ash et al. | 711/170 |
| 2005/0193240 | A1 * | 9/2005 | Ash et al. | 714/7 |
| 2005/0193242 | A1 * | 9/2005 | Ash et al. | 714/8 |
| 2005/0198446 | A1 * | 9/2005 | Ash et al. | 711/149 |

(Continued)

OTHER PUBLICATIONS

"Longitudinal Redundancy Check." Wikipedia: The Free Encyclopedia. Wikimedia Foundation, Inc. Mar. 28, 2008. <http://en.wikipedia.org/w/index.php?title=Longitudinal_redundancy_check&oldid=201573119>.*

*Primary Examiner* — Robert Beausoliel
*Assistant Examiner* — Joshua P Lottich
(74) *Attorney, Agent, or Firm* — Griffiths & Seaton PLLC

(57) ABSTRACT

A method, system, and computer program product for preserving data in a storage subsystem having dual cache and dual nonvolatile storage (NVS) through a failover from a failed cluster to a surviving cluster is provided. A memory preserved indicator is initiated to mark tracks on a cache of the surviving cluster to be preserved, the tracks having an image in an NVS of the failed cluster. A destage operation is performed to destage the marked tracks. Subsequent to a determination that each of the marked tracks have been destaged, the memory preserved indicator is disabled to remove the mark from the tracks. If the surviving cluster reboots previous to each of the marked tracks having been destaged, the cache is verified as a memory preserved cache, the marked tracks are retained for processing while all unmarked tracks are removed, and the marked tracks are processed.

20 Claims, 4 Drawing Sheets

U.S. PATENT DOCUMENTS

| | | | |
|---|---|---|---|
| 2005/0210323 A1* | 9/2005 | Batchelor et al. | 714/14 |
| 2005/0240809 A1* | 10/2005 | Ash et al. | 714/8 |
| 2007/0186058 A1* | 8/2007 | Ash et al. | 711/149 |
| 2007/0220313 A1* | 9/2007 | Katsuragi et al. | 714/6 |
| 2008/0091973 A1* | 4/2008 | Ash et al. | 714/7 |
| 2008/0126841 A1* | 5/2008 | Benhanokh et al. | 714/5 |

* cited by examiner

MEMORY PRESERVED CACHE TO PREVENT DATA LOSS

CROSS-REFERENCE TO RELATED APPLICATIONS

This application is related to U.S. Non-Provisional application Ser. No. 12/132,128, filed concurrently herewith and incorporated herein by reference.

BACKGROUND OF THE INVENTION

1. Field of the Invention

The present invention relates in general to computers, and more particularly to a method, system, and computer program product for implementing a memory preserved cache in a storage subsystem to prevent data loss during a failover operation from a failed cluster to a surviving cluster of the storage subsystem.

2. Description of the Related Art

Storage devices such as disks are commonplace in today's society. Devices such as controllers control access to the storage devices in response to read and write requests. The storage controllers also mirror data to different storage devices and spread data amongst different storage devices for redundancy and backup purposes. Storage controllers may store data in accordance with one of several redundant array of independent disk (RAID) security levels. Generally, the higher the RAID level the greater the redundancy of the data storage. Pooled storage devices may be used to increase storage capacity and provide recovery and backup services.

Storage servers, such as an IBM Enterprise Storage Server (ESS), are also becoming commonplace. An IBM ESS storage server includes two clusters of processors and associated hardware. Typically, there are four storage controllers in each cluster. Each of the storage controllers controls multiple storage devices grouped in RAID arrays. In one environment, clients with Fiber Channel Host Bus Adapters ("HBAs") are coupled via a Fiber Channel to a switch. The switch is also coupled to the Storage Server with Fiber Channel HBAs. There may be multiple storage servers per client. Each client is assigned or allocated storage "volumes" which are mapped to physical locations on storage devices that are grouped in RAID arrays. Consequently, clients make data access requests (reads and writes) to the storage server, for data within their allocated volumes, and the storage server accesses the mapped locations in cache storage to satisfy the requests or from disk if the data does not reside in cache storage.

A known IBM Enterprise Storage Server comprises two clusters of storage controllers with four storage controllers per cluster. Each cluster has its own cache (semiconductor) memory shared by all storage controllers in the cluster. Each cluster also has battery backed up nonvolatile storage ("NVS") which is shared by all of the storage controllers in the cluster, although any one storage controller cannot use more than 25 percent of the total NVS allocated to the cluster. In addition, each storage controller has its own cache (disk) storage. The cache memory is used for rapid access to data inpaged from external storage to service read data access requests from memory and to provide buffering of modified data. All update requests are written to the associated cluster and backed up by the NVS on the mirrored cluster.

Occasionally, a cluster of the ESS may become partially or wholly inoperable, and may fail, in which case a failover process is implemented. The failover transfers operation of a failed component (in this case, the failed cluster) to a similar, redundant component (e.g., a surviving cluster) to ensure uninterrupted data flow. Data in NVS is preserved in the event of a power loss and reboot of an associated cluster. However, there are some time intervals where tracks of data reside solely in the cache (semiconductor) memory. One such time interval is immediately following a failover. Typically, some data to be stored on disk is in cache (with the remainder in NVS) on one cluster, with the reverse (data stored on cache in the first cluster stored in NVS of the second cluster, and data stored on NVS of the first cluster stored in cache of the second cluster) stored in the mirrored cluster. Following a failover of the first cluster, a reboot of the surviving cluster may cause data loss (as the copy stored in the first cluster's NVS is inaccessible and the mirrored copy is stored in the second cluster's cache, exposing it to the reboot operation).

SUMMARY OF THE INVENTION

A need exists for a mechanism to safeguard the data tracks on the surviving cluster's cache in the event of a reboot operation. Accordingly, in one embodiment, by way of example only, a method for preserving data in a storage subsystem having dual cache and dual nonvolatile storage (NVS) through a failover from a failed cluster to a surviving cluster is provided. A memory preserved indicator is initiated to mark tracks on a cache of the surviving cluster to be preserved, the tracks having an image in an NVS of the failed cluster. A destage operation is performed to destage the marked tracks. Subsequent to a determination that each of the marked tracks has been destaged, the memory preserved indicator is disabled to remove the mark from the tracks. If the surviving cluster reboots previous to each of the marked tracks having been destaged, the cache is verified as a memory preserved cache, the marked tracks are retained for processing while all unmarked tracks are removed, and the marked tracks are processed.

In an additional embodiment, again by way of example only, a system for preserving data in a storage subsystem having dual cache and dual nonvolatile storage (NVS) through a failover from a failed cluster to a surviving cluster is provided. A storage management program (SMP) module is in communication with the failed and surviving clusters. The SMP module is adapted for initiating a memory preserved indicator to mark tracks on a cache of the surviving cluster to be preserved, the tracks having an image in an NVS of the failed cluster, performing a destage operation to destage the marked tracks from the cache of the surviving cluster to disk, and subsequent to a determination that each of the marked tracks have been destaged, disabling the memory preserved indicator to remove the mark from the tracks. The SMP module is further adapted for, if the surviving cluster reboots previous to each of the marked tracks having been destaged, verifying the cache as a memory preserved cache, retaining the marked tracks for processing while removing all unmarked tracks, and processing the marked tracks.

In still another embodiment, again by way of example only, a computer program product for preserving data in a storage subsystem having dual cache and dual nonvolatile storage (NVS) through a failover from a failed cluster to a surviving cluster is provided. The computer program product comprises a computer-readable storage medium having computer-readable program code portions stored therein. The computer-readable program code portions comprise a first executable portion for initiating a memory preserved indicator to mark tracks on a cache of the surviving cluster to be preserved, the tracks having an image in an NVS of the failed cluster, a second executable portion for performing a destage operation to destage the marked tracks from the cache of the surviving cluster to disk, and a third executable portion for, subsequent to a determination that each of the marked tracks have been destaged, disabling the memory preserved indicator to remove the mark from the tracks. If the surviving cluster reboots previous to each of the marked tracks having been destaged, the cache is verified as a memory preserved cache, the marked tracks are retained for processing while all unmarked tracks are removed, and the marked tracks are processed.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

The illustrated embodiments below provide mechanisms for preserving data through a failover from a failed cluster to a surviving cluster in a storage subsystem. These embodiments include use of a memory preservable indicator. The memory preservable indicator acts to designate tracks on the surviving cluster's cache memory having a data image in NVS of the failed cluster. In one embodiment, these tracks are marked as converted direct access storage device (DASD) fast write tracks (CDFW).

Once the failover has completed, a high-speed destage scan may then be performed to destage the marked tracks from the cache to disk. As these tracks get destaged, they will no longer be designated marked tracks as such. If all marked tracks are destaged following the failover, then the memory preservable indicator is deactivated.

In some cases the surviving cluster may reboot (perhaps repeatedly) following the failover process. This may be due to a data storage interrupt (DSI) that crashes the operating system (OS) of the surviving cluster, multiple PANICS (microcode logic errors associated with the warmstart process), and the like. If the surviving cluster reboots, the present invention may implement failsafe mechanisms to verify the previously designated memory preserved cache tracks, retain and process the tracks. These failsafe mechanisms will be further described, following.

Figure 1:
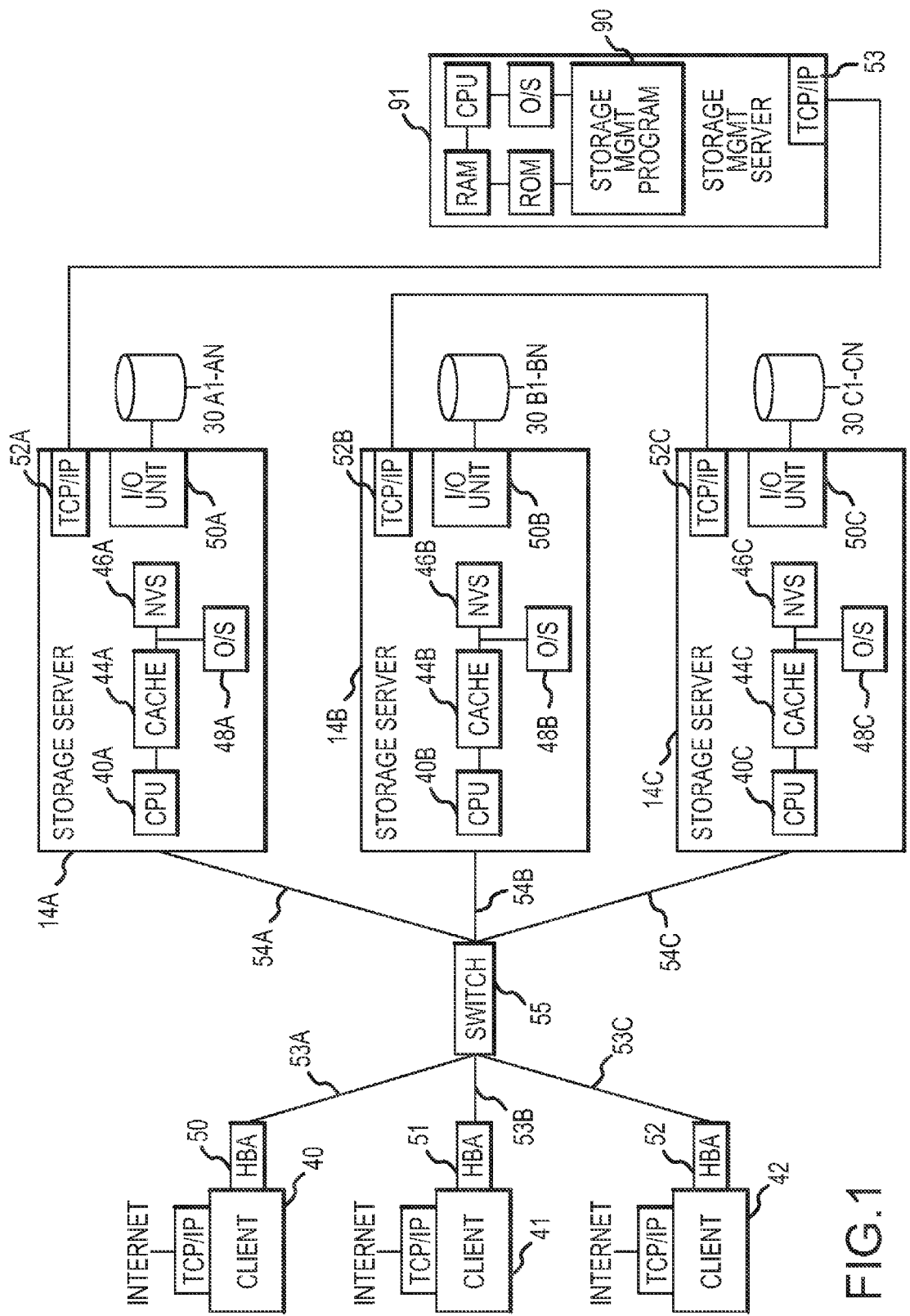
FIG. 1 is a block diagram of a distributed computer system including storage servers and a storage management server, in which aspects of the following description and claimed subject matter may be implemented.

FIG. 1 hereafter provides one example of a portion of a mirrored data storage system architecture in which the mechanisms of the illustrative embodiments may be implemented. It should be appreciated, however, that FIG. 1 is only exemplary and is not intended to state or imply any limitation as to the particular architectures in which the exemplary aspects of the illustrative embodiments may be implemented.

Many modifications to the architecture depicted in FIG. 1 may be made without departing from the scope and spirit of the following description and claimed subject matter.

FIG. 1 illustrates an exemplary distributed computer system generally designated 10 which includes the present invention. System 10 comprises multiple, similar storage servers 14a,b,c with respective CPU 40a,b,c, CACHE 44a,b,c, nonvolatile storage ("NVS") 46a,b,c, operating system 48a,b,c, I/O unit 50a,b,c, and TCP/IP adapter card 52a,b,c. Each of the storage servers 14a,b,c manages storage allocation and access to multiple storage devices (such as disks) 30a1-an, 30b1-bn, and 30c1-cn, respectively, by clients 40, 41 and 42. Clients 40, 41 and 42 have adapter cards 50, 51 and 52, such as a Fibre Channel adapter cards, for connection via a communication path 53a,b,c, such as a Fibre Channel, to a switch 55. Switch 55 can be coupled to storage servers 14a,b,c via host busses 54a,b,c, and can forward a request from any of the clients 40, 41 or 42 to any of the storage servers 14,a,b,c as configured on the client. An administrator has allocated to each of the clients 40, 41 and 42 a number of storage "volumes". Each "volume" resides on a storage array. A "storage array" can comprise one or more storage devices and be configured in a variety of RAID levels such as RAID 5, RAID 10 or Just a Bunch of Disks (commonly referred to as JBOD).

Figure 2:
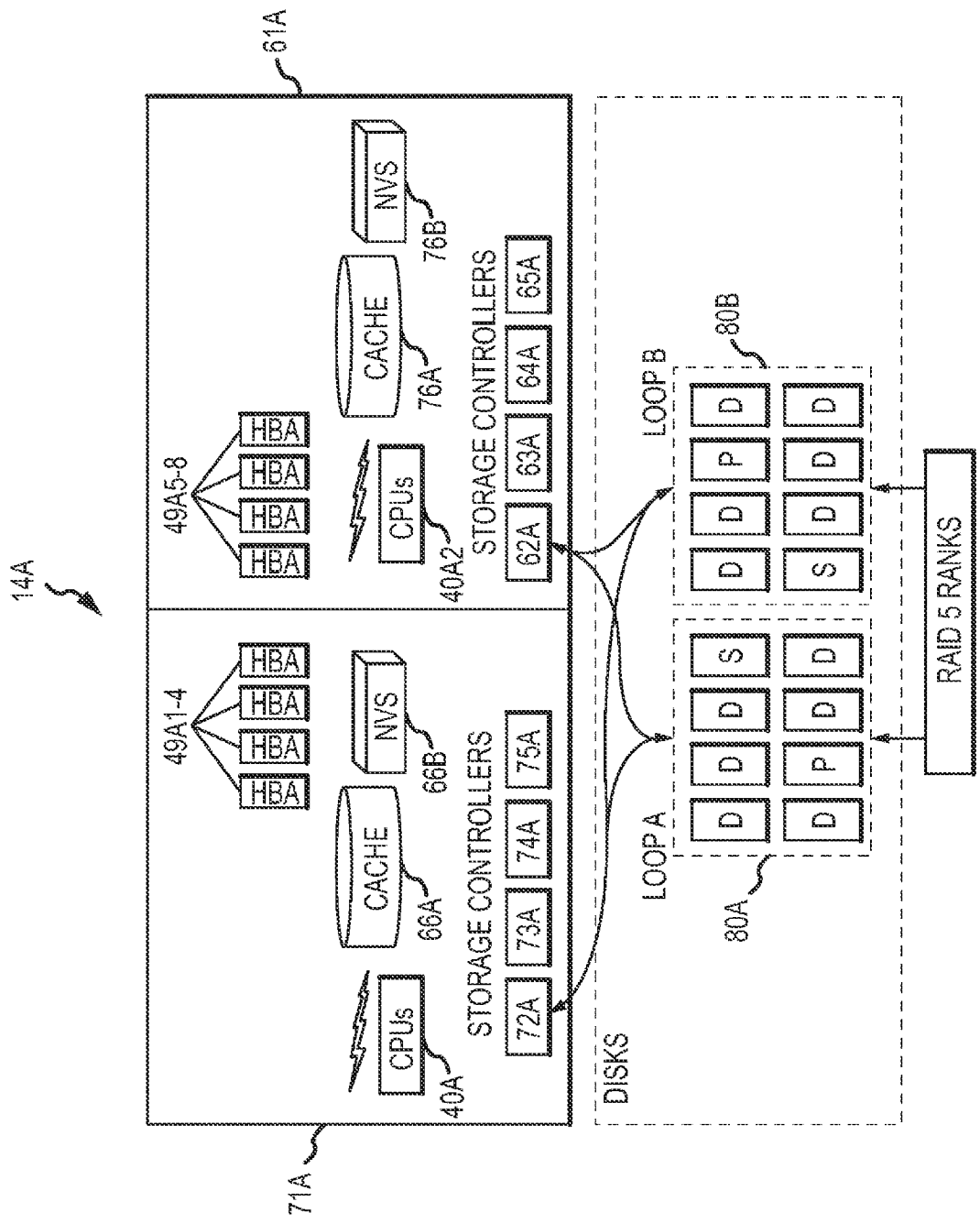
FIG. 2 is a block diagram of one of the storage servers of FIG. 1.

In the exemplary embodiment illustrated in FIG. 2, storage server 14a (and likewise storage servers 14b and c) includes two identical clusters 61a and 71a of CPUs, Cache, NVS, and storage controllers, with four storage respective controllers 62a-65a and 72a-75a per cluster. There is a shared cache (semiconductor) memory 66a and 76a for each cluster 61a and 71a, respectively. Each cluster also contains battery backed-up storage 66b and 76b (also called "NVS"). In FIG. 2, "D" represents a data disk, "P" represents a parity disk for storing parity bits for the data in the data disks, and "S" represents a spare disk in the event of failure of a data disk or parity disk. Each cluster maintains a mapping of the storage allocation to each client that correlates each storage volume to corresponding physical locations on the storage arrays. When the client requests access to storage, i.e. to read from or write to data in one of the volumes allocated to the client, then the storage cluster that manages that volume will process the request, i.e. temporarily store client updates into the cache memory and NVS on the paired cluster. For update requests, an I/O completion notification is sent to the client upon NVS store. Upon reaching an internal threshold for pending writes, the cluster will map the client request to the physical locations, and then forward the mapped request from the cache storage to the appropriate storage array. For read requests, data is either satisfied from cache memory or requires disk access (because of a "cache miss"). Cache misses for read requests require the cluster to map the client request to the physical locations on the storage array and transfer the data from the physical location on the arrays to the cache memory where it satisfies the client I/O request.

Referring again to FIG. 1, system 10 also includes a storage management program (SMP) module 90 in a storage management server 91, according to the present invention to detect failover occurrences, implement the aforementioned preserved memory cache, and process the retained tracks. In the illustrated embodiment, computer 91 is coupled to storage servers 14a,b,c via a SAN network. Alternately, there can be a separate instance of module 90 executing on each storage server 14a,b,c and communicating with the other instances of program 90 on the other storage servers via a TCP/IP network. The skilled artisan will appreciate that a variety of implementations of SMP module in communication with the overall storage subsystem are contemplated.

Various mechanisms for verifying, retaining, and processing memory preserved-designated tracks through a scenario where the surviving cluster reboots are now described. In one embodiment, an initial microcode load (IML) following a reboot may verify if the previous reboot was a "memory preserved cache reboot" (i.e., the reboot occurred while memory preserved-designated tracks were stored in cache). The IML may first verify a signature of the data structure in cache by comparing the signature to the known value. The signature is a unique microcode created data pattern that signifies if the memory was preserved across the reboot. This signature is guaranteed to be different from any memory test pattern. If the signature and the known value do not compare, then microcode indicates that no cache image exists, and the cache memory is initialized.

Next, a longitudinal redundancy check (LRC) of the data structure is performed and validated. If the LRC invalidates the data, then microcode will again indicate that no cache image exists, and the cache memory will be initialized.

The memory preservable indicator may then be checked. If it is determined that the indicator is not set, it may be determined that the cluster was unable to process write-in-progress threads. Here again, an unset indicator will cause microcode to indicate that no cache image exists, and the cache memory will be initialized.

When an IML detects a memory preserved reboot according to the foregoing, a counter in the data structure may be incremented. If the value of the counter exceeds a predetermined value, then microcode may indicate that no cache image exists, and the memory may be initialized. Use of the counter prevents a scenario where repetitive reboots caused by a corrupted structure in the marked tracks to be preserved. The counter may then be reset when all tracks in the memory preserved cache have been processed.

During cache processing, all track data structures that are designated to be preserved may be verified for data structural validity. Any data structures with invalid attributes (such as an invalid LRC) or data structural incongruity may cause the cache image to be discarded.

Once a memory preserved cache is verified according to the foregoing, then all tracks may then be processed during the remainder of the IML. As a first step, all tracks in cache other than the marked tracks (e.g., CDFW tracks) may be discarded. In addition, metadata may be discarded as the metadata may be unreliable and is reproducible. Depending on the machine state, the marked tracks may be processed as follows. If the ranks are in a good state, then all the marked tracks may be destaged to disk. Alternatively, if it is determined that there is space in NVS, then the marked tracks may be retro-restored in the NVS of the surviving cluster. Finally, if some ranks are not determined to be in a good state or there is not room in NVS, the marked tracks may be pinned in the cache. The IML then continues to completion without the threat of data loss.

Figure 3:
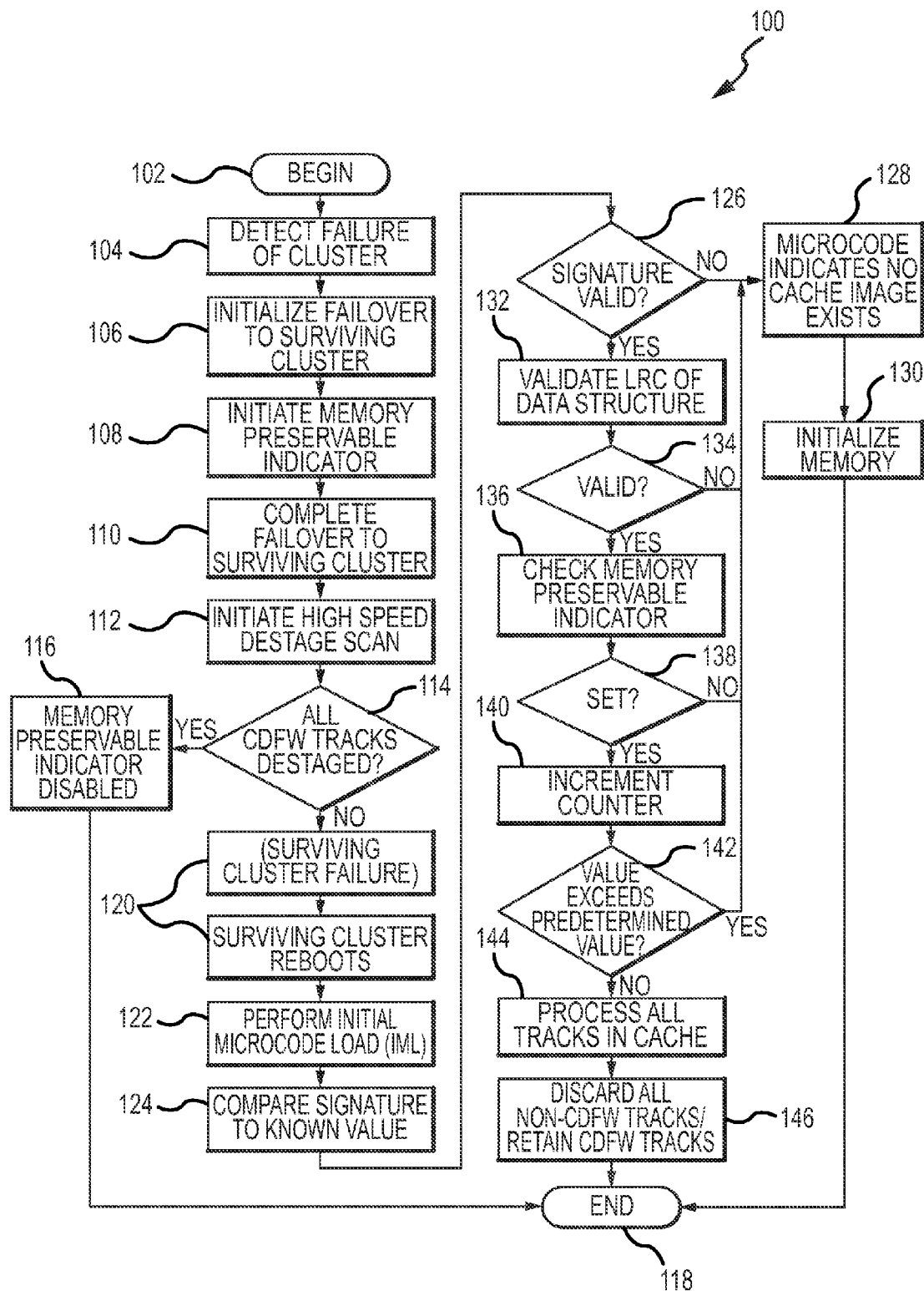
FIG. 3 is a flow chart of an exemplary method of preserving data.
Figure 4:
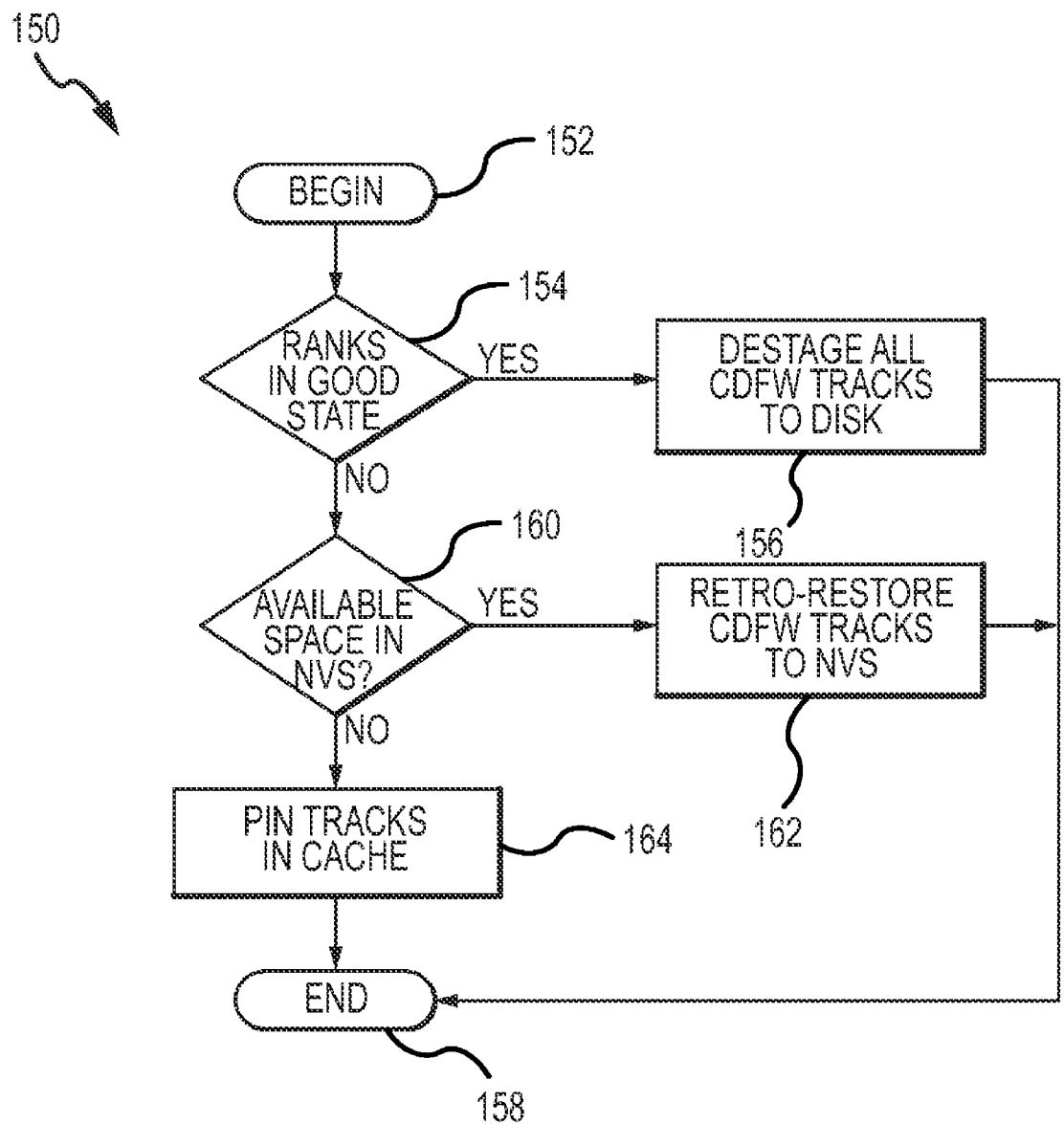
FIG. 4 is a flow chart of an exemplary method for processing marked data tracks.

FIGS. 3 and 4, following, illustrate exemplary methods for preserving data through a failover and reboot process, as well as processing data tracks marked for preservation. As one skilled in the art will appreciate, various steps in the methods 100 and 150 may be implemented in differing ways to suit a particular application. In addition, the described methods may be implemented by various means, such as hardware, software, firmware, or a combination thereof operational on or otherwise associated with the storage environment. For example, the methods may be implemented, partially or wholly, as a computer program product including a computer-readable storage medium having computer-readable program code portions stored therein. The computer-readable storage medium may include disk drives, flash memory, digital versatile disks (DVDs), compact disks (CDs), and other types of storage mediums.

Turning to FIG. 3, an exemplary method 100 for preserving data through a failover operation as previously described is depicted. Method 100 begins (step 102) with the detection of a failure of a first cluster (step 104). A failover process from the failed cluster to the surviving cluster is begun to ensure data flow (step 106).

Once the failover process begins, the memory preservable indicator is initiated (step 108). The indicator designates tracks on the cache for preservation as previously described. The failover process completes to the surviving cluster (step 110). A high-speed destage scan process is begun to destage the marked tracks from the memory preserved cache locations to disk (step 112).

If it is determined that each of the marked tracks have been destaged (step 114), the method 100 disables the memory preservable indicator (step 116). Method 100 then ends (step 118). If, however, not all of the marked tracks are destaged (for example, due to a reboot of the surviving cluster) (steps 114, 120), then method 100 moves to step 122 where an IML process is begun following a reboot (step 122).

Method 100 detects the boot as a memory preservable reboot, and takes steps to verify the marked tracks as follows. The signature is compared to the known value (step 124). If the signature is invalid (step 126), then microcode indicates that no cache image exists (step 128) and the cache memory is initialized (step 130). The method 100 ends (again, step 118).

In a further verification step, if the signature is validated (again, step 126), the LRC of the data structure is then validated (step 132). If not (step 134), then cache memory is initialized (again, steps 128, 130) and the method 100 ends (again, step 118). If the LRC is valid (again, step 134), then the memory preservable indicator is consulted to determine if it is set (step 136). If not (step 138), then cache memory is initialized (again, step 128, 130) and the method 100 ends (again, step 118).

If the memory preservable indicator is determined to be set (again, step 138), then the increment counter in the data structure is incremented (step 140) as previously described. If the value of the counter exceeds a predetermined value, then cache memory is initialized (again, step 128, 130) so as to prevent repetitive reboots caused by a corrupted structure in the preserved data. If the value does not exceed the predetermined value (again, step 142), then the method 100 moves to process the tracks in cache memory (step 144). All marked (converted) tracks are retained, while metadata and non-marked tracks are discarded (step 146). An exemplary method of processing such tracks is described in method 150, (FIG. 4), following. Method 100 then ends (again, step 118).

FIG. 4 illustrates an exemplary method 150 for processing the marked tracks once they are verified following a memory preserved reboot as previously described. Method 150 begins by determining if the ranks of the marked tracks are in good state (step 154). If so, the tracks are destaged from cache to disk (step 156) and the method 150 ends (step 158).

If it cannot be determined that the ranks are in good state, the method 150 queries whether there is available space on the NVS of the surviving cluster cache (step 160). If so, the marked tracks are retro-restored to NVS (step 162). If not, the tracks are pinned in cache (step 164) by placing the tracks on a pinned retryable list where they will be destaged once the ranks are in a good state. The method 150 then ends (again, step 158).

Some of the functional units described in this specification have been labeled as modules in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method for preserving data in a storage subsystem having dual cache and dual nonvolatile storage (NVS) through a failover from a failed cluster to a surviving cluster, comprising:
   initiating a memory preserved indicator to mark tracks on a cache of the surviving cluster to be preserved, the tracks having an image in an NVS of the failed cluster;
   performing a destage operation to destage the marked tracks from the cache of the surviving cluster to disk, wherein:
      if one or more ranks associated with the marked tracks is determined to be in a good state, the marked tracks are destaged, otherwise
      if available space is located the marked tracks are retro-restored to the NVS of the surviving cluster, otherwise
      the marked tracks are pinned in the cache of the surviving cluster; and
   subsequent to a determination that each of the marked tracks have been destaged, disabling the memory preserved indicator to remove the mark from the tracks, wherein if the surviving cluster reboots previous to each of the marked tracks having been destaged:
      the cache of the surviving cluster is verified as a memory preserved cache,
      the marked tracks are retained for processing while all unmarked tracks are removed, and
      the marked tracks are processed.

2. The method of claim 1, wherein retaining the marked tracks for processing while removing all unmarked tracks includes removing metadata tracks from the cache of the surviving cluster.

3. The method of claim 1, wherein verifying the cache of the surviving cluster as a memory preserved cache includes comparing a signature of the cache of the surviving cluster with a known value, initializing a cache memory if the signature of the cache of the surviving cluster and the known value do not compare.

4. The method of claim 1, wherein verifying the cache of the surviving cluster as a memory preserved cache includes validating a longitudinal redundancy check (LRC) of a data structure of the cache of the surviving cluster, initializing a cache memory if the LRC of the data structure is not valid.

5. The method of claim 1, wherein verifying the cache of the surviving cluster as a memory preserved cache includes checking the memory preserved indicator to determine if the memory preserved indicator is set, initializing a cache memory if the memory preserved indicator is not set.

6. The method of claim 1, wherein verifying the cache of the surviving cluster as a memory preserved cache includes examining a data structure of the cache of the surviving cluster for structure incongruity, initializing a cache memory if structure incongruity is found.

7. The method of claim 1, wherein initiating a memory preserved indicator to mark tracks on flail the cache of the surviving cluster to be preserved includes designating direct access storage device (DASD) fast write (DFW) tracks as converted DASD fast write tracks (CDFW).

8. The method of claim 1, further including incrementing a counter associated with a data structure of the cache of the surviving cluster upon the rebooting of the surviving cluster, wherein if a value of the counter exceeds a predetermined value, indicating that one of a cache image exists and no cache image exists.

9. A system for preserving data in a storage subsystem having dual cache and dual nonvolatile storage (NVS) through a failover from a failed cluster to a surviving cluster, comprising:
   dual cache;
   dual nonvolatile storage (NVS); and
   a storage management program (SMP) module in communication with the failed and surviving clusters, wherein the SMP module is adapted for:
      initiating a memory preserved indicator to mark tracks on a cache of the surviving cluster to be preserved, the tracks having an image in an NVS of the failed cluster,
      performing a destage operation to destage the marked tracks from the cache of the surviving cluster to disk, wherein:
         if one or more ranks associated with the marked tracks is determined to be in a good state, the marked tracks are destaged, otherwise
         if available space is located the marked tracks are retro-restored to the NVS of the surviving cluster, otherwise
         the marked tracks are pinned in the cache of the surviving cluster, and
      subsequent to a determination that each of the marked tracks have been destaged, disabling the memory preserved indicator to remove the mark from the tracks, wherein if the surviving cluster reboots previous to each of the marked tracks having been destaged:
         the cache of the surviving cluster is verified as a memory preserved cache, the marked tracks are retained for processing while removing all unmarked tracks are removed, and the marked tracks are processed.

10. The system of claim 9, wherein the SMP module is further adapted for, if the surviving cluster reboots previous to each of the marked tracks having been destaged, removing metadata tracks from the cache of the surviving cluster.

11. The system of claim 9, wherein the SMP module is further adapted for comparing a signature of the cache of the surviving cluster with a known value, initializing a cache memory if the signature of the cache and the known value do not compare.

12. The system of claim 9, wherein the SMP module is further adapted for validating a longitudinal redundancy check (LRC) of a data structure of the cache of the surviving cluster, initializing a cache memory if the LRC of the data structure is not valid.

13. The system of claim 9, wherein the SMP module is further adapted for checking the memory preserved indicator to determine if the memory preserved indicator is set, initializing a cache memory if the memory preserved indicator is not set.

14. The system of claim 9, wherein the SMP module is further adapted for examining a data structure of the cache of the surviving cluster for structure incongruity, initializing a cache memory if structure incongruity is found.

15. The system of claim 9, wherein the SMP module is further adapted for designating direct access storage device (DASD) fast write (DFW) tracks as converted DASD fast write tracks (CDFW).

16. The system of claim 9, further including incrementing a counter associated with a data structure of the cache of the surviving cluster upon the rebooting of the surviving cluster, wherein if a value of the counter exceeds a predetermined value, indicating that one of a cache image exists and no cache image exists.

17. A computer program product for preserving data in a storage subsystem having dual cache and dual nonvolatile storage (NVS) through a failover from a failed cluster to a surviving cluster, the computer program product comprising a computer-readable storage medium having computer-readable program code portions stored therein, the computer-readable program code portions comprising:

a first executable portion for initiating a memory preserved indicator to mark tracks on a cache of the surviving cluster to be preserved, the tracks having an image in an NVS of the failed cluster;

a second executable portion for performing a destage operation to destage the marked tracks from the cache of the surviving cluster to disk, wherein:

if one or more ranks associated with the marked tracks is determined to be in a good state, the marked tracks are destaged, otherwise if available space is located the marked tracks are retro-restored to the NVS of the surviving cluster, otherwise the marked tracks are pinned in the cache of the surviving cluster; and a third executable portion for, subsequent to a determination that each of the marked tracks have been destaged, disabling the memory preserved indicator to remove the mark from the tracks, wherein if the surviving cluster reboots previous to each of the marked tracks having been destaged:

the cache of the surviving cluster is verified as a memory preserved cache, the marked tracks are retained for processing while removing all unmarked tracks are removed, and the marked tracks are processed.

18. The computer program product of claim 17, wherein the third executable portion for retaining the marked tracks for processing while removing all unmarked tracks includes a fourth executable portion for removing metadata tracks from the cache of the surviving cluster.

19. The computer program product of claim 17, wherein the third executable portion for verifying the cache of the surviving cluster as a memory preserved cache includes a fourth executable portion for at least one of:

comparing a signature of the cache of the surviving cluster with a known value, initializing a cache memory if the signature of the cache of the surviving cluster and the known value do not compare, validating a longitudinal redundancy check (LRC) of a data structure of the cache of the surviving cluster, initializing a cache memory if the LRC of the data structure is not valid, checking the memory preserved indicator to determine if the memory preserved indicator is set, initializing a cache memory if the memory preserved indicator is not set, and examining a data structure of the cache of the surviving cluster for structure incongruity, initializing a cache memory if structure incongruity is found.

20. The computer program product of claim 17, wherein the third executable portion for processing the marked tracks includes a fourth executable portion for:

incrementing a counter associated with a data structure of the cache of the surviving cluster upon the rebooting of the surviving cluster, wherein if a value of the counter exceeds a predetermined value, indicating that one of a cache image exists and no cache image exists.

* * * * *